United States Patent
Malofsky

[11] Patent Number: 5,544,787
[45] Date of Patent: Aug. 13, 1996

[54] REUSABLE DISPENSING ASSEMBLY FOR SUSCEPTOR-FREE MICROWAVEABLE ADHESIVE CHARGE, AND MICROWAVEABLE ADHESIVE CHARGE THEREFOR

[75] Inventor: Bernard M. Malofsky, Bloomfield, Conn.

[73] Assignee: Loctite Corporation, Hartford, Conn.

[21] Appl. No.: 287,978

[22] Filed: Aug. 10, 1994

[51] Int. Cl.⁶ .................................................. B65D 35/56
[52] U.S. Cl. ..................... 222/105; 219/759; 222/146.2; 222/146.5; 222/183; 222/325
[58] Field of Search ......................... 222/92, 105, 146.2, 222/146.5, 183, 206, 215, 325; 219/759

[56] References Cited

U.S. PATENT DOCUMENTS

| | | | |
|---|---|---|---|
| 3,817,426 | 6/1974 | Fooks | 222/105 |
| 4,658,989 | 4/1987 | Bonerb | 222/105 |
| 5,188,256 | 2/1993 | Nottingham et al. | 222/1 |
| 5,221,016 | 6/1993 | Karpal | 222/183 X |
| 5,231,268 | 7/1993 | Hall et al. | 219/759 X |

FOREIGN PATENT DOCUMENTS

| | | | |
|---|---|---|---|
| 4339769 | 11/1992 | Japan | 222/105 |
| WO92/09503 | 6/1992 | WIPO | |
| WO93/01247 | 1/1993 | WIPO | |

OTHER PUBLICATIONS

Ser. No. 08/020,662, filed 02/22/94, Nottingham, et al.
Ser. No. 08/020,511, filed 02/22/93, Haas, et al.

*Primary Examiner*—Joseph A. Kaufman
*Attorney, Agent, or Firm*—Steven J. Hultquist

[57] ABSTRACT

A dispensing assembly for heating and subsequent dispensing of a microwaveable adhesive material, comprising: a dispenser housing having a microwaveable adhesive charge-receiving cavity therein; a microwave susceptor member in the cavity, constructed and arranged to receive microwave energy when the dispensing assembly is exposed to microwave radiation and to responsively generate heat; and a microwaveable adhesive charge of a size and shape for insertion into and retention in the cavity including the microwave receptor, the charge comprising a container having disposed therein a microwaveable adhesive material; wherein the microwaveable adhesive charge is devoid of susceptor materials and susceptor structure. Also disclosed are susceptor-free adhesive charge articles.

10 Claims, 3 Drawing Sheets ness of the present invention will
REUSABLE DISPENSING ASSEMBLY FOR SUSCEPTOR-FREE MICROWAVEABLE ADHESIVE CHARGE, AND MICROWAVEABLE ADHESIVE CHARGE THEREFOR

BACKGROUND OF THE INVENTION

1. Field of the Invention

The present invention relates generally to a reusable assembly for heating and dispensing of microwaveable hot melt adhesive materials and to a dispensing material charge for use therein.

2. Description of the Related Art

In the use of hot melt adhesives and other flowable materials which are desirably dispensed in heated condition at the locus of application, the packaging of the heatable, flowable (at least in the heated state) material is an aspect of fundamental importance in the deployment of the material.

Many of such materials immediately prior to their dispensing at the application locus are suitably heated by microwave, ultrasonic, infrared, or other thermal radiation means, to provide the material at the appropriate temperature for the dispensing operation, e.g., in a readily flowable or self-leveling state. For such heating, it is preferable to deploy the material in a heatable form, in a package in which it may also be heated as well as subsequently dispensed.

In the provision of such packaging for sequential storage, heating and dispensing of heated materials, a wide variety of packaging designs has been proposed by the prior art for microwave-heated materials, such as hot melt adhesives which are provided in solid stick form and which under microwave irradiation melt to form a flowable hot melt adhesive medium for bonding and sealant applications.

International Patent Application No. PCT/US91/08661 published Jun. 11, 1992 for "Microwave Hot Melt Adhesive Package and Dispenser," describes a package including a flexible pouch defining a chamber containing the hot melt adhesive, with a dispensing means provided as part of the pouch to permit squeezing dispensing of the hot melt adhesive. The package may include an insulating jacket for facilitating the handling of the package, particularly when the adhesive is in the elevated temperature melt form. The insulating jacket may be formed of polypropylene foam or preferably a foam blend of polystyrene and polyphenylene oxide which may be adhered to and laminated with the microwave transparent layer of the container. In the embodiment shown in FIGS. 1–3 of the patent, the insulating jacket comprises an insulating layer which is heat sealed with a microwave transparent layer at edge portions thereof. The hot melt adhesive employed in such package and dispenser is described to be of varying type (e.g., a water-retaining type which does not require microwave susceptors, or alternatively a type including microwave susceptors in the form of microwave susceptor particles blended or mixed in the hot melt adhesive medium).

International Patent Application No. PCT/US92/05604 published Jan. 21, 1993 discloses a microwave activatable adhesive article including the hot-melt or heat-curable adhesive, and a microwave susceptor layer of at least electrically semi-conductive microwave radiation absorbing material. The susceptor layer is disposed on at least a portion of the substrate, and is responsive to exposure to microwave radiation for raising the temperature of the substrate above a desired level sufficient to melt the substrate.

U.S. Pat. 5,188,256 issued Feb. 23, 1993 to J. R. Nottingham, et al. discloses a hot melt adhesive dispenser including a container having hot melt adhesive therein, and a susceptor comprising metal particles adhered to a film such as a high temperature polyimid film, wherein the susceptor is in heat transfer relationship with the hot melt adhesive. The hot melt adhesive container may be formed of a flexible film material having high temperature resistance, and the susceptor may be provided on an interior surface of the container, or otherwise in heat transfer relationship to the hot melt adhesive material. The dispenser disclosed in this patent may further comprise a cover of relatively rigid, heat insulating composite material, such as a foam polystyrene laminated with a bleached hardwood craft paper.

Other hot melt adhesive dispensers are disclosed in co-pending U.S. patent application Nos. 08/020,511, now abandoned; 08/020,622, now abandoned; and: 08/200,852, now U.S. Pat. No. 5,368,199, which variously disclose dispensers in which microwave susceptors are a component of the container for the hot melt adhesive. U.S. application No. 08/200,852 discloses the concept of a reusable package or sleeve accommodating receipt therein of a hot melt adhesive container including as a component of the container a microwave susceptor material.

It is an object of the present invention to provide an improved, and reusable, microwaveable adhesive dispensing assembly, and an adhesive charge adapted for use therewith.

Another object of the present invention is to provide an adhesive charge which is of a readily mass-produceable and low-cost character.

Other objects and advantages of the present invention will be more fully apparent from the ensuing disclosure and appended claims.

SUMMARY OF THE INVENTION

In one aspect, the present invention relates to a dispensing assembly for heating and subsequent dispensing of a microwaveable adhesive material, comprising:

a dispenser housing having a microwaveable adhesive charge-receiving cavity therein;

a microwave susceptor member in said cavity, constructed and arranged to receive microwave energy when the dispensing assembly is exposed to microwave radiation and to responsively generate heat; and a microwaveable adhesive charge of a size and shape for insertion into and retention in the cavity including said microwave receptor, the charge comprising a container having disposed therein a heatable material, wherein the charge is devoid of susceptor materials and susceptor structure.

The dispenser housing may be formed with any desired shape, and of any suitable materials of construction, and may for example comprise an insulating liner formed of a foamed or expanded polymeric material, of microwave-transmissible character, such as a material selected from the group consisting of polyethylene foam, polypropylene foam, polyphenylene oxide foam, polystyrene foam and silicone foam, or, more generally, a thermally insulative material selected from the group consisting of plastics, polymeric gels, polymeric foams, rubbers, and thermally insulative composite materials.

The dispenser housing includes a cavity therein for receiving the microwaveable adhesive charge, as hereinafter more fully described.

The insulating sleeve in the aforementioned dispenser housing construction may be of elongate form, having a generally uniform cross-section along at least a portion of its length, and preferably is of elongate cylindrical form along a major portion of its length, together with a distal portion of truncated conical shape, having an opening at its distal end, and with an open proximal end. The cylindrical sleeve member thus has a central cylindrical bore constituting the cavity for containing the microwaveable adhesive charge.

In one embodiment, the dispenser housing comprising the insulating sleeve may be adapted to be reposed on and positioned statically by a base containing a cavity therein receiving a lower portion of the insulating sleeve, whereby the sleeve is positioned in vertically upwardly extending relationship to the base. Alternatively, the dispenser housing may be integrally and unitarily formed with a base portion for positioning on the floor of a microwave oven or other support surface.

In the dispenser housing, e.g., comprising the aforementioned insulating sleeve, the housing on its interior surface bounding the cavity has a susceptor material associated therewith. The susceptor may for example be in the form of a liner or jacket comprising a susceptor material, as a structural element of the dispensing assembly which is separate and distinct from the dispenser housing per se. Alternatively, the housing wall surface bounding the cavity itself be coated with or otherwise incorporate the susceptor material, provided that the housing is sufficient size (thickness) and shape so that the outer surface of the housing is manually graspable by a user of the dispensing assembly.

The susceptor may be of a known, temperature self-limiting type, in which impingement of microwave radiation on the susceptor results in conversion of the microwave radiation to heat energy, with consequent associated temperature rise in the susceptor (which heat energy is conductively transferrable to the microwaveable adhesive medium, disposed in proximate, preferably contiguous, relationship to the susceptor in the dispensing assembly), up to the self-limiting temperature level, beyond which no appreciable temperature rise is achieved with further microwave exposure.

Alternatively, the susceptor material may be of a non-self-limiting nature with respect to microwave exposure/temperature response, and such susceptor material may have associated therewith an elevated temperature-limiting material to prevent heating of the hot melt adhesive material in the adhesive material charge, above a predetermined temperature level.

In instances where the dispensing assembly comprises a susceptor layer or liner in the housing, a thermally insulating material layer, such as a fiberglass mat, or felted liner of heat-insulating material, may suitably be disposed between the susceptor element and the housing, to ensure that even when the susceptor has been heated to high temperature by microwave exposure thereof, the user of the dispensing assembly is not burned or subjected to discomfort by heat transmission through the housing.

In some instances, the housing may itself be constructed of suitable insulative material, and/or of a suitable thickness, obviating the need for such additional insulative stuctural member, but in the instance where the housing comprises a material such as a polymeric foam material of construction, the additional thermal insulative liner or liners is/are preferred, for reasons of safety and heat-retention efficiency.

The hot melt adhesive material charge suitably comprises the hot melt adhesive material in a container of suitable size and shape, constructed of any suitable material, such as a high temperature-resistant material. The container may for example be formed of a thin film material of such type, or alternatively of an injection-molded plastic or other satisfactory material of construction.

In one specific aspect, the present invention relates to a dispenser assembly for use with a charge comprising hot melt adhesive material, comprising:

an insulating sleeve having a cavity comprising a central bore extending through at least a major portion of the insulating sleeve and bounded by an interior surface of the sleeve;

a susceptor material disposed on at least a portion of said interior surface; and a base member comprising a cavity into which the insulating sleeve is positionable so as to supportively maintain the insulating sleeve in a selected position relative to said base.

In a further aspect, the invention relates to dispensing assembly comprising an insulating sleeve containing removable insert(s) which are unitarily removable from the sleeve, such insert(s) comprising a susceptor material, and preferably at least one thermally insulating, nonconductive layers disposable between the susceptor material and the housing.

DETAILED DESCRIPTION OF THE INVENTION AND PREFERRED EMBODIMENTS THEREOF

Figure 1:
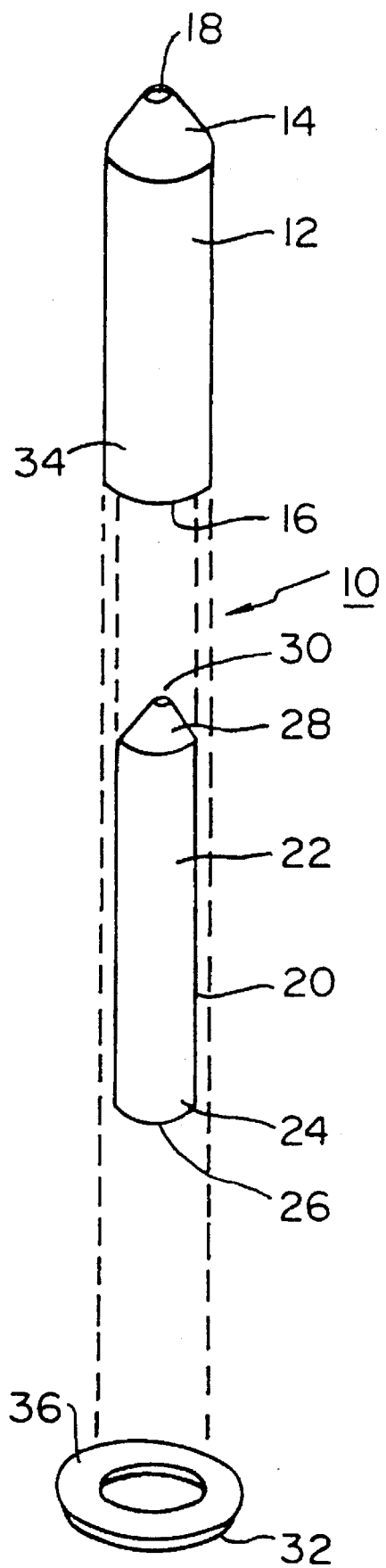
FIG. 1 is an exploded perspective view of a microwaveable adhesive dispensing assembly according to one embodiment of the present invention.

Referring now to the drawings, FIG. 1 is an exploded perspective view of a microwaveable adhesive dispensing assembly 10 according to one embodiment of the present invention.

The microwaveable adhesive dispensing assembly includes an insulating sleeve 12 of generally cylindrical form having a conical distal portion 14 and a proximal open end 16 communicating with a central bore of the sleeve and terminating in distal opening 18. The insulating sleeve 12 on its interior surface may have associated therewith interior layers of optional components, such as insulating material layers or liners, susceptor liners, mechanical integrity support liners, temperature-limiting inner sleeves serving coactively with the susceptor layer to limit the maximum temperature of the dispensing assembly when subjected to radiation (e.g., microwave) exposure, etc.

When a separate susceptor liner is present in the dispensing assembly, it is suitably and preferably disposed adjacent the adhesive charge, to provide high efficiency heating of the susceptor material and resultant heat transfer (conductive heating) to the adhesive charge, for melting of the initially solid adhesive material and production of a desired temperature therein for the desired adhesive dispensing operation. With the provision of such a susceptor liner or material surrounding the adhesive charge, and in recognition of the fact that the susceptor under radiation impingement conditions achieves very high temperature, it generally is desirable to dispose a thermally insulating material layer about the susceptor layer, between the susceptor layer and the insulating sleeve, to ensure that the user of the dispensing assembly is adequately protected against thermal burns during the handling and use of the dispensing assembly.

Illustrative of potentially useful susceptor materials in the broad practice of the present invention are materials such as carbon black and particulate ferromagnetic materials such as ferrites, spinels, and spinel ferrites, it being recognized that any suitable susceptor material or materials may be employed, as desired or otherwise appropriate in a given end use application of the invention.

The insulating sleeve 12 is sized and shaped to accommodate insertion into its interior bore of a hot melt adhesive charge 20 comprising a hot melt adhesive medium 22 encased in a container 24 which may be formed of high temperature resistance material. The high temperature resistance material may be in the form of a thin film, or it may be provided in the form of an injection molded material or other preformed material (e.g., an injection-molded silicone tube into which the adhesive material is loaded), it being understood that the container 24 is formable by a wide variety of fabrication processes, and is formable of a wide variety of suitable materials of construction.

In the embodiment shown, the hot melt adhesive charge container 24 is closed at its proximal end 26 and features a conical-shaped distal portion 28 having an adhesive dispensing opening 30 at its distal extremity.

The insulating sleeve 12 in the dispensing assembly shown in FIG. 1 is matingly arranged with respect to base member 32, which as shown may comprise a support having a circular-shaped cavity therein which receives the lower end portion 34 of insulating sleeve 12 therein, whereby the insulating sleeve containing the hot melt adhesive charge 20 may be stably mounted in the base member 32 and surrounded by the upper collar portion 36 thereof, so that the overall assembly may be reposed in unitary fashion in a microwave oven or in proximity to other heating means, for heating of the adhesive medium 22 in the hot melt adhesive charge 20.

The insulating sleeve 12 may be formed of any suitable heat insulating material, preferably a foamed or expanded polymeric material such as polyethylene foam, polypropylene foam, modified polythenylene oxide foam, polystyrene foam, etc., or other suitable insulating material of construction. The insulative sleeve is preferably manufactured from flexible, resilient, relatively deformable materials capable of withstanding high temperatures, for example temperatures of up to 500° F., for periods of time for which the dispensing apparatus is contemplated to be subjected to elevated temperature exposure, e.g., in a microwave oven.

The insulating sleeve provides a cool-to-the-touch structural member which is manually graspable without burning of the user's hands, and the insulating sleeve, being essentially non-heat-transmissive, serves to retain heat in the material being dispensed, thereby extending the period of operability of the dispenser before additional heating is necessary.

The insulating sleeve is, in instances where microwave heating of hot melt adhesive is employed, microwave transmissive (transparent) in character, and capable of maintaining its shape and properties in exposure to the heating conditions.

In the embodiment of the invention shown in FIG. 1, the insulating sleeve 12 is of unitary and seamless character. In contrast to prior art thermally molded insulating sleeves, the insulating sleeve 12 may be shaped at ambient temperatures (ambient here referring to temperatures in the range of from about 0° to about 40° C.).

In consequence of its seamless character, the insulating sleeve avoids the seam splitting and spreading problems of prior art seamed sleeves. Further, because it is shaped at ambient temperature, the insulating sleeve has better shape retention than the prior art seamed insulating sleeves. Further, the seamless sleeve is amenable to ready modification in shape or size, and is amenable to high volume mass production, thus overcoming significant deficiencies of the prior art seamed sleeves.

Figure 2:
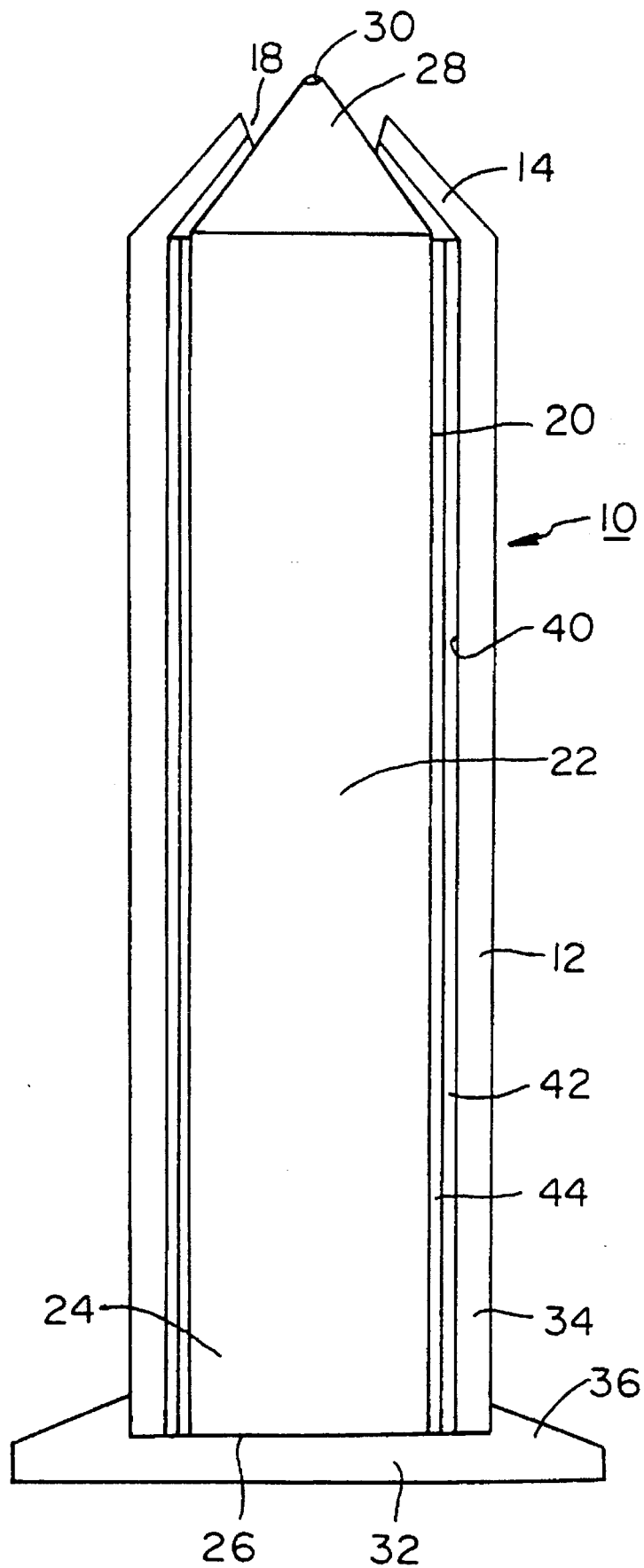
FIG. 2 is a vertical elevation sectional view of the microwaveable adhesive dispensing assembly shown in FIG. 1.

Referring now to FIG. 2, there is shown an elevation view in partial section of a dispensing assembly 10 of the type as shown in FIG. 1. All parts and elements in FIG. 2 are numbered correspondingly to FIG. 1, for ease of description.

As illustrated in FIG. 2, the base 32 of the dispensing assembly includes an upper collar portion for retentive placement of the insulating sleeve 12 therein at the lower portion 34 of the sleeve. The sleeve at its conical distal end portion 14 terminates at distal opening 18, through which the distal conical portion 28 of hot melt adhesive charge 20 upwardly protrudes, so that distal opening 30 of the hot melt adhesive charge 20 is disposed exteriorly of the insulating sleeve 12, to facilitate dispensing of the hot melt adhesive 22 from the charge 20. For such purpose, the sleeve, although relatively rigid, is sufficiently deformable as to allow manual squeezing of the charge 20 by manual pressure exerted compressively on the outer surface of the insulating sleeve 12.

In the dispensing assembly shown in FIG. 2, the inner surface 40 of the insulating sleeve 12 has optionally secured thereto one or more layers, including in the specific embodiment shown in FIG. 2, first layer 42 and second layer 44, it being understood that such layers may be wholly absent and that the container 24 holding the adhesive charge 22 may be in direct abutting contact with the inner wall surface 40 of the insulating sleeve.

The optional illustrated layers 42 and 44 may comprise any suitable respective materials of construction layers as necessary or desirable in a given end use application of the dispensing assembly 10.

For example, one of such layers, e.g., layer 42, may comprise a thermally insulating, non-conductive material layer, such as a fiberglass mat, or a woven or non-woven jacket containing a finely divided particulate-form mineralic insulator material. The other one of such layers, e.g., layer 44, may comprise a susceptor liner of a suitable susceptor material of a type known in the art, for the purpose of effecting heating of the hot melt adhesive to a desired elevated temperature. The susceptor may be of a material which is absorptive of microwave or other electromagnetic energy impinged thereon. The thus-heated susceptor is in heat-transmission relationship to the adhesive charge 20, and thereby effects transfer of the requisite heat energy to the hot melt adhesive medium 22.

Preferably, at least one of the additional optional layers is a thermally non-conductive material layer, and most preferably, the outermost of the additional optional layers is a thermally non-conductive material layer, particularly where the inner layer (or one of multiple inner layers) is a susceptor material layer. The susceptor material layer, when present, preferably is located directly adjacent, in contiguous position, to the adhesive charge.

In the event that multiple additional optional layers are provided in the dispensing assembly, e.g., between the adhesive charge and the insulating sleeve, one of such layers may comprise a liner of suitable material imparting enhanced mechanical integrity to the insulating sleeve, or otherwise providing enhanced structural and/or performance characteristics to the dispensing assembly, relative to a dispensing assembly lacking same.

Correspondingly, the interior surface 40 of the insulating sleeve may have associated therewith any other and differing layers, liners, or other materials, efficacious for the storage, heating and dispensing of the adhesive medium or other medium to be dispensed by the dispensing assembly.

By the structure of the insulating sleeve., it is possible to utilize adhesive charges 20 of widely varying character.

In accordance with the present invention, the hot melt adhesive charge is devoid of any susceptor material or structure, with the susceptor, if present at all, being associated with the insulating sleeve, or as a separate element or structure of the overall adhesive dispensing assembly.

The charge 20 may, as hereinabove described, comprise a bag or container 24 formed of a suitable material of construction, e.g., a thin film material, or an injection-molded plastic material, for purposes of containing the solid adhesive medium 22 and dispensing of same after being heated to a flowable heated state.

In this respect, it will be appreciated that prior art hot melt adhesive dispensing systems have invariably utilized susceptor materials as a constituent part of the container in which the adhesive medium is disposed. It is correspondingly to be appreciated that such susceptor components constitute a relatively expensive part of the dispensing apparatus, and when utilized in the package comprising the adhesive medium, the charges introduced into the insulating sleeve in such prior art systems, are of a relatively expensive character.

Contrariwise, in the dispensing assembly of the present invention, the susceptor material may be provided in the form of a layer or liner which is affixed to or secured directly or indirectly to the insulating sleeve, whereby the susceptor component is a reusable part of the dispensing assembly.

In use of the dispensing assembly shown in FIGS. 1 and 2, the reusable insulating sleeve assembly comprising optional layers 42 and/or 44, e.g., a fiberglass insulation mat or other layer of thermally non-conductive material as the layer 42, and a liner of susceptor material as the layer 44, is utilized to receive a disposable charge container 24 of hot melt adhesive medium 22.

The hot melt adhesive in solid form thus is provided as a "stick" or cylindrical article of medium to be dispensed, contained within a suitable container 24, such as a thin film polymeric material container constructed of a high temperature-resistant material such as polyimide or other suitable material known in the art. The sleeve assembly containing the charge then is reposed on the base 32 and disposed in a microwave heating oven at or in proximity to the application locus of use of the hot melt adhesive.

Subsequent to heating of the hot melt adhesive medium to a flowable state, the dispensing assembly, comprising insulating sleeve 12, adhesive charge 20, and base 32, is suitably removed from the microwave heating oven and transported to the locus of use. At the locus of use, the sleeve assembly may be manually compressed to exert pressure on the adhesive medium 22, via compressive deformation of the insulating liner against the container 24 holding the flowable adhesive medium, to cause issuance of the adhesive through distal opening 30 from container 24.

Subsequent to use of the charge, the material-depleted container 24 may be removed from the insulating liner assembly and discarded.

By this arrangement, the adhesive charge is readily mass produceable in a convenient and economic manner, permitting significant cost savings to be realized in the use of hot melt adhesive media.

Figure 3:
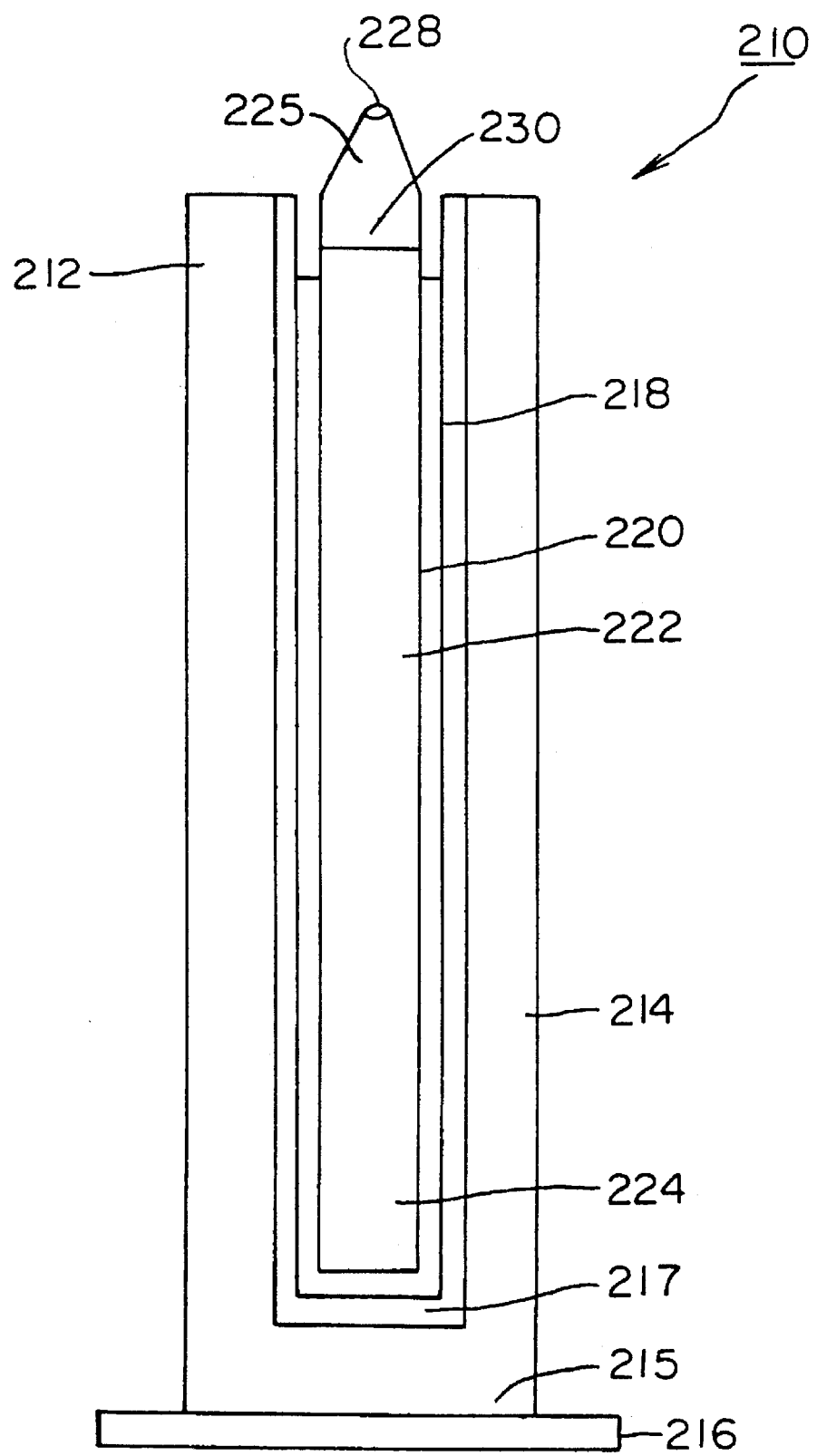
FIG. 3 is a sectional elevation view of a dispensing assembly according to one embodiment of the invention, featuring removable insert members including susceptor means.

FIG. 3 is a sectional elevation view of a hot melt adhesive dispensing assembly 210 according to another embodiment of the invention.

The dispensing assembly 210 comprises a vertically upwardly extending insulating sleeve 214 which at its lower extremity 215 is secured to a base member 216. The insulating sleeve may as in previously described embodiments be arranged for removable mounting on the base member 216, as is described in the embodiment shown in FIGS. 1 and 2, or alternatively, the insulating sleeve 214 may be permanently secured at its lower end 215 to the base member 216, as for example by bonding, mechanical affixation, or the like.

The insulating sleeve 214 contains therewithin a cavity 217 as a central bore extending a major portion of the length of the sleeve. The cavity 217 is of cylindrical shape, so that the sleeve in turn is of an annular cylindrical structure, with the exception of the lower portion of the sleeve.

In cavity 217 is disposed a hot melt adhesive charge 222, comprising a container 224 which may be formed of a thin high temperature resistant film material which is microwave transmissive in character, or of other suitable microwave-transmissive material, being of generally cylindrical shape as shown with a conical-shaped distal portion 226 having an opening 228 at the distal extremity thereof.

The container 224 has disposed therein a hot melt adhesive medium 230, which prior to microwave heating thereof is of solid form, the charge 222 thus being referred to in the art as a "glue stick." The charge 222 is disposed in the cavity 217 in proximity to insert liners 218 and 220. The insert liners 218 and 220 may comprise any suitable elements as necessary or desirable for the microwave heating of the hot melt adhesive 230 in the charge 222. For example, the insert liner 220 may comprise a microwave susceptor material which in receipt of microwave radiation serves to become heated to a high temperature and conductively transfer heat through the heat transmissive container 224 to the hot melt adhesive 230 for melting thereof and heating of the hot melt adhesive to a predetermined temperature.

The insert liner 218 adjacent to insert liner 220 may in turn comprise an insulative medium, such as fiberglass, polymeric foam material, or any other suitable material such as those described illustratively hereinabove as used to form the insulating sleeve in the dispenser assembly of the invention.

In the embodiment shown in FIG. 3, the insert liners 218 and 220 may be readily replaceable or otherwise removable from cavity 217, so that these liners can be withdrawn from the sleeve and discarded in favor of replacement liner elements, as necessary or desirable in the use of the dispensing assembly. For example, a susceptor liner may after some period of use become diminished in heat-absorbing ability, and may desirably be replaced by a new substitute susceptor liner element.

By such arrangement of the dispensing assembly device shown in FIG. 3, the dispensing assembly 210 comprising sleeve 214, base member 216, charge 222, and liner layers 218 and 220, may be manually transported in unitary fashion from the oven or heating locus to the locus of use. At the locus of use, the hot melt adhesive may be selectively dispensed by manual compression exerted on the outer surface of the insulating sleeve 214, which in turn is transmitted through insert liner 218, insert liner 220, and container 224 to exert a pressure force on the contents of container 224 thereby causing the hot melt adhesive to issue from the container through opening 228 at the distal end thereof.

For such purpose, the insert liners 218 and 220 are desirably of a resiliently deformable, flexible material, and may be constructed and arranged analogously to the liner layers 42 and 44 in the FIG. 2 embodiment as described hereinabove, with at least one of the insert liners comprising a thermally insulative, non-conductive (of heat) material. The insert liner 218 may as mentioned comprise an insulating material and be of suitable character to accommodate manual compression and deformation, while at the same time providing sufficient thickness to ensure adequate insulative character to prevent burns or discomfort to the hands of a user holding same.

The assembly shown in FIG. 3 in like manner desirably comprises an insert liner 220 of a flexible, deformable character. When insert liner 220 is a susceptor, the liner may constitute a thin film material which is impregnated with or otherwise comprises or contains a microwave-sorptive material as an active susceptor ingredient.

It will be recognized that the insert liners 218 and 220 may be varied and that fewer or greater numbers of insert liner elements may be employed, as necessary or desirable in a given end use application.

In use, the dispensing assembly shown in FIG. 3, is unitarily placed in a microwave heating oven and subjected to microwave exposure conditions for sufficient time to effect microwave heating of the hot-melt adhesive material to a desired use temperature. The dispensing assembly then is removed from the oven and transported to the locus of use, where the heated hot-melt adhesive is selectively dispensed to the locus to be adhesively bonded. At the location of use, the dispensing assembly may be selectively reposed on a suitable support surface during the periods between actual dispensing use, resting on the base portion 216 of the housing structure.

It will correspondingly be recognized that the FIG. 3 dispensing assembly may be widely varied in specific construction and arrangement of insert liner components, as well as the shape and size of the insulating sleeve 214.

While the invention has been described hereinabove with reference to specific features, embodiments, and aspects, it will be appreciated that numerous variations, modifications and alternative embodiments are possible and are contemplated within the spirit and scope of the invention.

What is claimed is:

1. A two-part dispensing assembly for heating and subsequent dispensing of a microwaveable adhesive material, comprising:

(I) a reusable dispenser including:

(A) a housing having a microwaveable adhesive charge-receiving cavity therein, said housing including a sleeve with an interior surface, said sleeve being:
  formed of thermal insulating material, and
  constructed and arranged for (i) removable insertion of said microwavable adhesive charge into the cavity with a discharge portion of the microwavable adhesive charge protruding from the sleeve for selective dispensing of microwaved adhesive material by compressive force exteriorly exerted on the sleeve, and (ii) thermally insulating the microwavable adhesive charge other than the protruding discharge portion thereof; and (B) a microwave susceptor on the interior surface of the sleeve, said microwave susceptor being constructed and arranged to receive microwave energy when the dispensing assembly is exposed to microwave radiation and to responsively generate heat for transmission to the microwavable adhesive charge inserted into the cavity of the housing; and (II) a unitary microwaveable adhesive charge of a size and a shape for removable insertion thereof into and retention in the cavity of the housing, and selectively removable from the cavity, the unitary microwaveable adhesive charge comprising:

(A) a container, and (B) a microwaveable adhesive material in said container, wherein the microwaveable unitary adhesive charge is (i) devoid of susceptor materials and susceptor structure, and (ii) in heat-transfer relationship with said microwave susceptor when the microwaveable unitary adhesive charge is inserted into and retained in the cavity of the housing, and the dispensing assembly is exposed to microwave radiation.

2. A dispensing assembly according to claim 1, wherein said sleeve comprises an insulating liner formed of a microwave-transmissible material.

3. A dispensing assembly according to claim 1, wherein the dispenser comprises a base portion on which the sleeve is selectively engageable so that the dispenser is reposable on a flat supporting surface.

4. A dispensing assembly according to claim 1, wherein the dispenser sleeve comprises an interior bounding wall surface, and said interior bounding wall surface has said susceptor associated therewith.

5. A dispensing assembly according to claim 1, wherein the susceptor comprises a liner which is separate and distinct from the housing sleeve.

6. A dispensing assembly according to claim 1, wherein the dispenser is of a size and shape permitting the sleeve to be manually graspable by a user of the dispensing assembly.

7. A dispenser assembly for use with a susceptor-free unitary charge comprising a container containing a hot melt adhesive material, wherein said susceptor-free unitary charge is removably insertable into the dispenser assembly for dispensing of a hot melt adhesive when the hot melt adhesive is exposed to microwave radiation while in the dispenser assembly, said dispenser assembly comprising:

a housing having a cavity therewithin, said housing comprising an insulating sleeve with a central bore extending through at least a major portion of the insulating sleeve and bounded by an interior surface of the sleeve, said cavity being of a size, shape, and arrangement to accommodate removable insertion therein of said susceptor-free unitary charge;

a susceptor member disposed in said central bore and bounding said cavity within said housing; and a thermally insulating layer between the susceptor member and the interior surface of the sleeve.

8. A dispensing assembly for use with a susceptor-free unitary charge comprising a container containing a hot melt adhesive material, wherein said susceptor-free unitary charge is removably insertable into the dispenser assembly for dispensing of a hot melt adhesive when the hot melt adhesive is exposed to microwave radiation while in the dispenser assembly, said dispenser assembly comprising:

a housing having a cavity therewithin, said housing comprising an insulative sleeve containing removable inserts which are unitarily removable from the housing, said inserts comprising a susceptor material insert, and at least one thermally insulating, nonconductive layer insert disposed between the susceptor material insert and the insulative sleeve of the housing, wherein each of said inserts is formed of a resiliantly deformable, flexible material.

9. A sleeve assembly for use with a unitary charge comprising a container containing a heatable material, wherein said unitary charge is removably insertable into the sleeve assembly for dispensing of said heatable material when the heatable material is exposed to microwave radiation while in the sleeve assembly, said sleeve assembly comprising:

- an insulating sleeve having a cavity therewithin for receipt of said unitary charge, said insulating sleeve comprising a central bore extending through at least a major portion of the insulating sleeve and bounded by an interior surface of the sleeve;
- a removable susceptor material insert liner formed of a resiliently deformable, flexible material, and disposed in the central bore between the unitary charge and said interior surface; and
- a base member on which the insulating sleeve is positioned to supportively maintain the insulating sleeve in a selected position relative to said base member.

10. A dispensing assembly for dispensing of a hot melt adhesive material, comprising a housing including an insulating sleeve and containing a cavity therein, a unitary hot melt adhesive material charge within the cavity in the housing, said unitary hot melt adhesive material charge comprising a container formed of a microwave-transmissive and thermally-transmissive film material and containing hot melt adhesive material which prior to microwave heating thereof is of solid form, said cavity and said unitary hot melt adhesive charge being cooperatively sized, shaped, and arranged so that the unitary hot melt adhesive charge is (i) selectively insertable into the cavity in the housing for said microwave heating while in the cavity, to form a flowable adhesive from the solid form hot melt material, (ii) retainable in the cavity subsequent to said microwave heating for dispensing of the flowable adhesive from the dispensing assembly, and (iii) selectively removable from the cavity in the housing subsequent to said dispensing of the flowable adhesive and a susceptor insert formed of a resiliently deformable, flexible material, which is positioned in the housing bounding the cavity and at least partially surrounding the charge, and which is unitarily removable from the sleeve.

* * * * *

UNITED STATES PATENT AND TRADEMARK OFFICE
CERTIFICATE OF CORRECTION

PATENT NO. : 5,544,787
DATED : August 13, 1996
INVENTOR(S) : Malofsky, Bernard M.

It is certified that error appears in the above-indentified patent and that said Letters Patent is hereby corrected as shown below:

Column 4, Line 40      Change "INVENTION AND" to --INVENTION, AND--

Column 3, Line 14      Delete "." before "upwardly"

Column 7, Line 12      Delete "." after the word "sleeve"

Column 7, Line 59      A new paragraph begins at "At the locus..."

Column 12, Line 8      Delete "." before the word "melt"

Signed and Sealed this

Eighteenth Day of February, 1997

Attest:

BRUCE LEHMAN

*Attesting Officer*      *Commissioner of Patents and Trademarks*